(12) United States Patent
Levy et al.

(10) Patent No.: US 8,794,552 B2
(45) Date of Patent: Aug. 5, 2014

(54) APPARATUS AND PROCESS FOR SEPARATING CARPET FIBERS

(71) Applicants: Frank J. Levy, Quogue, NY (US);
Sergio Dell'Orco, Campi Bisenzio (IT)

(72) Inventors: Frank J. Levy, Quogue, NY (US);
Sergio Dell'Orco, Campi Bisenzio (IT)

( * ) Notice: Subject to any disclaimer, the term of this patent is extended or adjusted under 35 U.S.C. 154(b) by 9 days.

(21) Appl. No.: 13/731,240

(22) Filed: Dec. 31, 2012

(65) Prior Publication Data

US 2013/0175377 A1    Jul. 11, 2013

Related U.S. Application Data

(63) Continuation of application No. 13/135,002, filed on Jun. 22, 2011.

(51) Int. Cl.
*B02C 17/00* (2006.01)
(52) U.S. Cl.
USPC ............... 241/24.19; 241/20; 241/21; 241/29
(58) Field of Classification Search
USPC ......... 241/73, 185.5, 186.2, 186.4, 189.1, 20, 241/21, 76, 77, 78, 152.2, 154, 157, 68
See application file for complete search history.

(56) References Cited

U.S. PATENT DOCUMENTS

| | | | | |
|---|---|---|---|---|
| 2,101,384 A * | 12/1937 | Coubray | ...................... | 177/108 |
| 2,696,025 A * | 12/1954 | Vandergriff | ..................... | 19/0.27 |
| 2,850,162 A * | 9/1958 | Widmer | ......................... | 209/134 |
| 3,360,870 A * | 1/1968 | Stephanoff | ..................... | 34/592 |
| 4,184,959 A * | 1/1980 | Marmo | ......................... | 210/179 |
| 4,689,143 A * | 8/1987 | Miers | ............................ | 209/240 |
| 5,230,473 A * | 7/1993 | Hagguist et al. | ................. | 241/3 |
| 5,338,339 A * | 8/1994 | Westphal | ....................... | 95/282 |
| 5,518,188 A * | 5/1996 | Sharer | ............................ | 241/14 |
| 5,535,945 A * | 7/1996 | Sferrazza et al. | .......... | 241/24.12 |
| 5,607,587 A * | 3/1997 | Langner | ...................... | 210/380.3 |
| 5,897,066 A * | 4/1999 | Bacon et al. | ................... | 241/160 |
| 6,059,207 A * | 5/2000 | Costello et al. | ............ | 241/24.12 |
| 6,250,575 B1 * | 6/2001 | White | ............................ | 241/76 |
| 7,040,489 B2 * | 5/2006 | Zemlin et al. | ................. | 209/691 |
| 7,503,513 B2 * | 3/2009 | Simon | ............................ | 241/19 |
| 7,784,719 B1 * | 8/2010 | Wingard | ......................... | 241/20 |
| 7,820,728 B2 * | 10/2010 | Wright et al. | ................ | 521/40.5 |
| 7,874,133 B2 * | 1/2011 | Depestel | ........................ | 56/13.3 |
| 8,017,662 B2 * | 9/2011 | Hoover et al. | ............... | 521/49.8 |
| 8,110,131 B1 * | 2/2012 | Dell'Orco et al. | ............ | 264/141 |
| 8,205,814 B2 * | 6/2012 | Lindsey et al. | ................. | 241/29 |
| 8,408,968 B2 * | 4/2013 | Gillis et al. | ..................... | 451/28 |
| 2007/0074998 A1 * | 4/2007 | Langner | ........................ | 209/284 |
| 2011/0094691 A1 * | 4/2011 | Nunn | ................................ | 162/4 |
| 2011/0288188 A1 * | 11/2011 | Walters | ........................... | 521/40 |

* cited by examiner

*Primary Examiner* — Mark Rosenbaum
*Assistant Examiner* — Homer Boyer
(74) *Attorney, Agent, or Firm* — Thomas A. O'Rourke; Bodner & O'Rourke, LLP

(57) ABSTRACT

Apparatus for separating components of post-consumer carpet—pile, adhesive, and primary/secondary backings—may initially comprise spectrographic face fiber identification. Separating substantial portions of pile from backing comprises feeding carpeting into a rotating pinned drum, with separated pile U's dropping, while a residual composition, being primarily backing, travels with the drum, to be separated therefrom using vacuum pressure, with the composite backing being sent to a press. Vacuum pressure delivers the separated U's to a spinning perforated squirrel cage to remove dislodged pieces of adhesive, by vacuum pressure applied to an interior top portion of the cage to draw pieces therein. Rotating the perforated squirrel cage, which is sealed on the exterior using a belt, permits the U's to drop into a hopper. A mesh shaker box vibrates to separate any remaining backing from the pile U's. Hammers in a fibermill remove remaining adhesive attached to the separated pile U fiber.

5 Claims, 14 Drawing Sheets

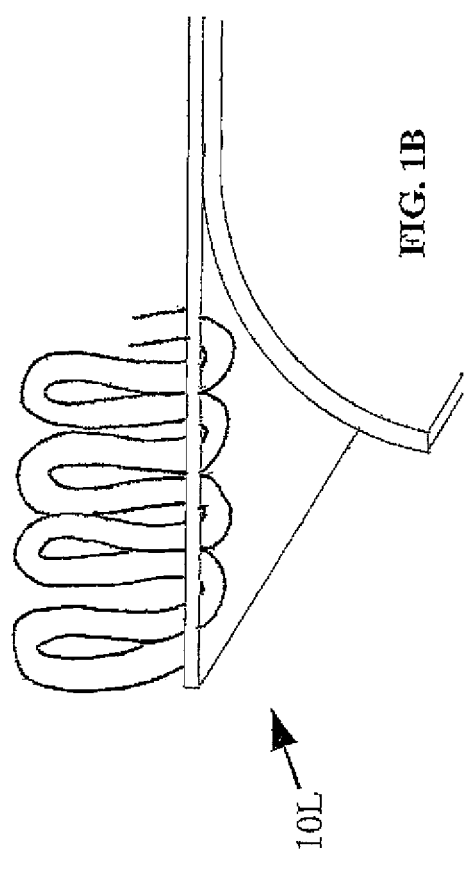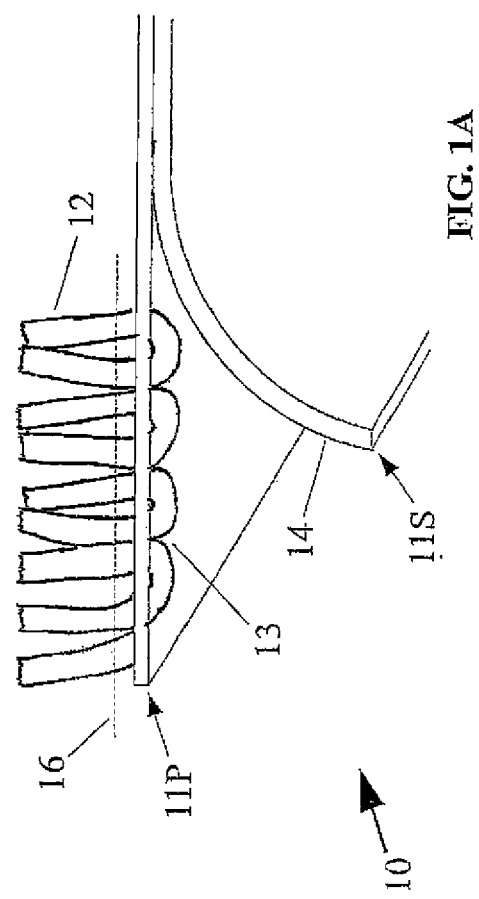

APPARATUS AND PROCESS FOR SEPARATING CARPET FIBERS

CROSS REFERENCES TO RELATED APPLICATIONS

This application is a continuation of U.S. application Ser. No. 13/135,002, filed on Jun. 22, 2011, the disclosures of which are incorporated herein by reference.

FIELD OF THE INVENTION

The present invention relates to improvements in carpet recycling and more particularly to post consumer carpet recycling wherein the post consumer carpet is more readily separated into its component polymeric materials.

BACKGROUND OF THE INVENTION

Recycling of waste materials is ever increasing in popularity and mirrors the concerns that many people have for the environment. In some cities and regions, recycling is even mandatory. Very often, many people try to conserve natural resources and reuse components of products can help in that effort. One example of mandated recycling is illustrated by the many states that have enacted legislation requiring a deposit on the purchaser of beverage containers in the form of aluminum cans and plastic bottles. The production of aluminum from bauxite is a very energy intensive process and recycling of aluminum cans therefore a cost effective endeavor. Recycling of soda bottles made of polyethylene terephthalate (PET) is another area where recycling has been successfully applied.

Reusing the PET from beverage bottles to form carpet fibers is one area where recycling has achieved certain benefits. Besides reducing the cost of the raw materials, such recycling has also reduced the amount of materials being disposed within landfills. It is not uncommon for carpet manufacturers to use recycled two liter soda bottles in the production of polyester based carpeting. PET polyester carpet is manufactured with yarn created from reclaimed polyester resins.

Post consumer carpet recycling has not become very wide spread. Post consumer carpet refers to the carpet that had been installed in a house or office, but is in need of removal and replacement with new carpeting or other types of flooring. Until recently, once the carpet in a house or office had worn out and was removed, the only destination for disposal had been a landfill. Because of the type of ingredients used in carpet, i.e. thermoplastic polymeric materials, carpet materials are not very biodegradable, and once buried in a landfill, a carpet may take as much as 20,000 years to fully degrade. At the present time, nearly six billion pounds of carpet are discarded per year in the United States, and as landfill space becomes scarcer while petroleum based products become more expensive due to increased crude oil costs, the need to recycle post consumer carpet becomes more necessary and more cost effective.

Carpets like many other composite materials are difficult to recycle effectively because they comprise a number of components made from different materials that have been combined into a finished product. These individual components, once extracted from the post consumer carpet, have significantly more value than as the composite. Carpets are comprised of a backing which supports and hold together a plurality of fibers that extend from the backing, and which farm the pile or surface that is walked on by the user. An adhesive based material may be used to secure the fibers to the backing, and is typically used to secure a secondary backing to the primary backing. Usually one type of polymeric material is used to make the fibers of the carpet pile, a different type of polymeric material is used to make the backing, while the adhesive used is frequently a third type of material. In many carpets, this face fiber that makes up the pile may be nylon, a polyolefin, a polyester, etc. The backing is usually a polypropylene material, although other materials may also be used. Because of the multiplicity of materials, carpet has been difficult to recycle into reusable constituent components because the materials that comprise the carpet can not be readily or easily separated into those individual polymers. While there are some uses for composite polymeric materials, the value of the recycled post consumer carpet increases significantly if the components are separated.

Because of the difficulties in separating the carpet components, some companies have resorted to reusing the carpet as a fuel, and burn the carpet as a source of heat instead of dumping it in a landfill. In the burning method of recycling, the carpet may be burned as a fuel and the heat is used to generate steam which can then be used to generate electricity. The heat generated by the burning carpet can also be used for other purposes. While this reduces landfill dumping, it is not an ideal means of recycling the carpet.

Another approach towards carpet recycling can include melting the carpet rather than burning it, and thereafter attempting to separate the components in the blend based upon their melting or vaporization points. But this process is energy intensive and requires complex equipment. This equipment necessary must prevent each of the distinctive material fibers from burning when, yet must allow them to be heated to the proper melting temperatures to facilitate separation of the components. Additionally, separating those melted composite of carpet materials is not easily performed. Because of the difficulty in separating the melted components of a carpet, this recycled material is usually not used for new carpet, but is instead used in such products like park benches, and other similar items where a blend of different polymers is not objectionable.

OBJECTS OF THE INVENTION

It is an object of the invention to provide a system for recycling portions of carpets.

It is an object of the invention to provide an apparatus for recycling post consumer carpet.

It is also an object of the invention to provide a system for mechanically separating carpet components for recycling.

It is a further object of the invention to separate unsheared U's (the long U's) comprising the carpet pile from the backing.

It is a still further object of the invention to separate sheared U's (short U's) of carpet pile from the carpet backing.

It is another object of the invention to separate the remnant fiber portions of the carpet backing material from the U's.

It is a further object of the invention to separate the remaining adhesive still attached to the separated U's.

Further objects and advantages of the invention will become apparent from the following description and claims, and from the accompanying drawings.

SUMMARY OF THE INVENTION

A carpet recycling apparatus, for use in separating pile, backing, and adhesive of post-consumer carpet may comprises three or four different stages of apparatus performing distinctly different operations. An important step in recycling post-consumer carpet involves identifying the particular fiber used in the carpet pile. Herein a sensor may be used to accomplish near infrared reflectance (NIR) or Raman spectroscopy, to identify the spectral signature of the particular polymer molecules of the pile currently being recycled by the apparatus. The sensor may be hand held and comprise a separate first stage, or the sensor may alternatively be integral to any one of the other three stages of the process.

A second stage apparatus may be for use in mechanically separating a substantial portion of pile from the backing(s). The second stage apparatus may consist of a drum having a cylindrical outer surface, with the drum being rotatably mounted, and with it comprising a plurality of pins protruding outward from the cylindrical surface. The pins may be generally equally spaced circumferentially about the cylindrical outer surface, and may be generally equally spaced laterally across the cylindrical surface. A curved feed dish may have a first end and a second end, with the second end terminating in proximity to the drum, and comprising a sharp edge. The feed dish may comprise curvature having a tangency being approximately tangent to a cylindrical surface formed by the ends of the plurality of pins.

To be able to easily feed post-consumer carpet into the apparatus at a reasonable rate, a feed belt revolving about a pair of rollers may be included. The feed belt may be as wide as the drum itself, which may be 12 feet wide to accommodate a full-width piece of post-consumer carpet to be processed without the need for it to be trimmed into smaller sections prior to recycling. One or more rollers being positioned proximate to the pinned drum, direct the carpet against the feed dish, whose curvature causes the carpet to engage the pins of the drum at an optimal angle for removal of the U's of the pile, and for shredding of the backing. A pile rejecting plate being in close proximity to said pins of the drum directs the rejected U's into a receptacle. A guide member may serve to help retain the shredded backing on the rotating drum, while pieces of dislodged adhesive may fall through perforations in the guide member for collection in a bin. Beyond the perforations, a source of negative pressure may be used to draw the shredded backing away from the drum and into a chute. The shredded backing may actually be a residual composite material comprising mainly the primary and secondary backing, as well as small pieces of remnant pile that remains attached to the shredded backing by the adhesive. The shredded backing may be sent to a press, while the separated U's, which may also comprise remnant backing fibers and some adhesive, is sent to the next stage for processing.

The first part of the third stage apparatus may comprise a condensing apparatus, which may be for use in drawing away any pieces of adhesive that was dislodged during from the pile U's during vacuum transportation to the third stage. A perforated squirrel cage divided into an upper portion and a lower portion may be used, by applying vacuum pressure to the sealed upper portion to draw away the dislodged pieces of adhesive. The U's may then drop into a buffer section, which may contain a series of paddle wheels usable to direct the pile U's into a weight pan, when necessary for a processing cycle. When the weight pan has received a set amount of material, it may open to drop that weight of residual composite material into a shaker pen. The shaker pen is usable for separating remnant backing fibers from the pile U's. The shaker pen comprises one or more walls having a top opening and a bottom opening, with the bottom opening of the shaker pen being covered by a pivotable mesh. The top opening may be sealed by a door. Shaking or vibrating of the shaker pen causes the remnant backing fibers to become dislodged from the U's, leaving the smaller U's to fall through the mesh openings, to be directed by a deflecting plate into a first conduit. After a set time period, after which most of the pile has been dislodged and removed, the mesh pivots to release the remaining backing fiber, which is then directed by the deflector plate into a second conduit.

A fourth stage of the process may be for use in mechanically separating a substantial portion of remaining adhesive from the separated pile U's. Removal of the adhesive still attached to the U's may occur through timed treatment of the U's through a hammering operation within a fibermill, after which the fiber may be ducted outward from the fibermill using vacuum pressure, while the crushed adhesive falls through a grill. A final step in the process may comprise baling, pelletizing, or agglomerating the separated post-consumer carpet components.

BRIEF DESCRIPTION OF THE DRAWINGS

FIG. 1A is a perspective view of a representative section of carpet having loop pile face yarn.

FIG. 1B is a perspective view of a representative section of carpet having cut pile face yarn.

DETAILED DESCRIPTION OF THE INVENTION

Figure 2:
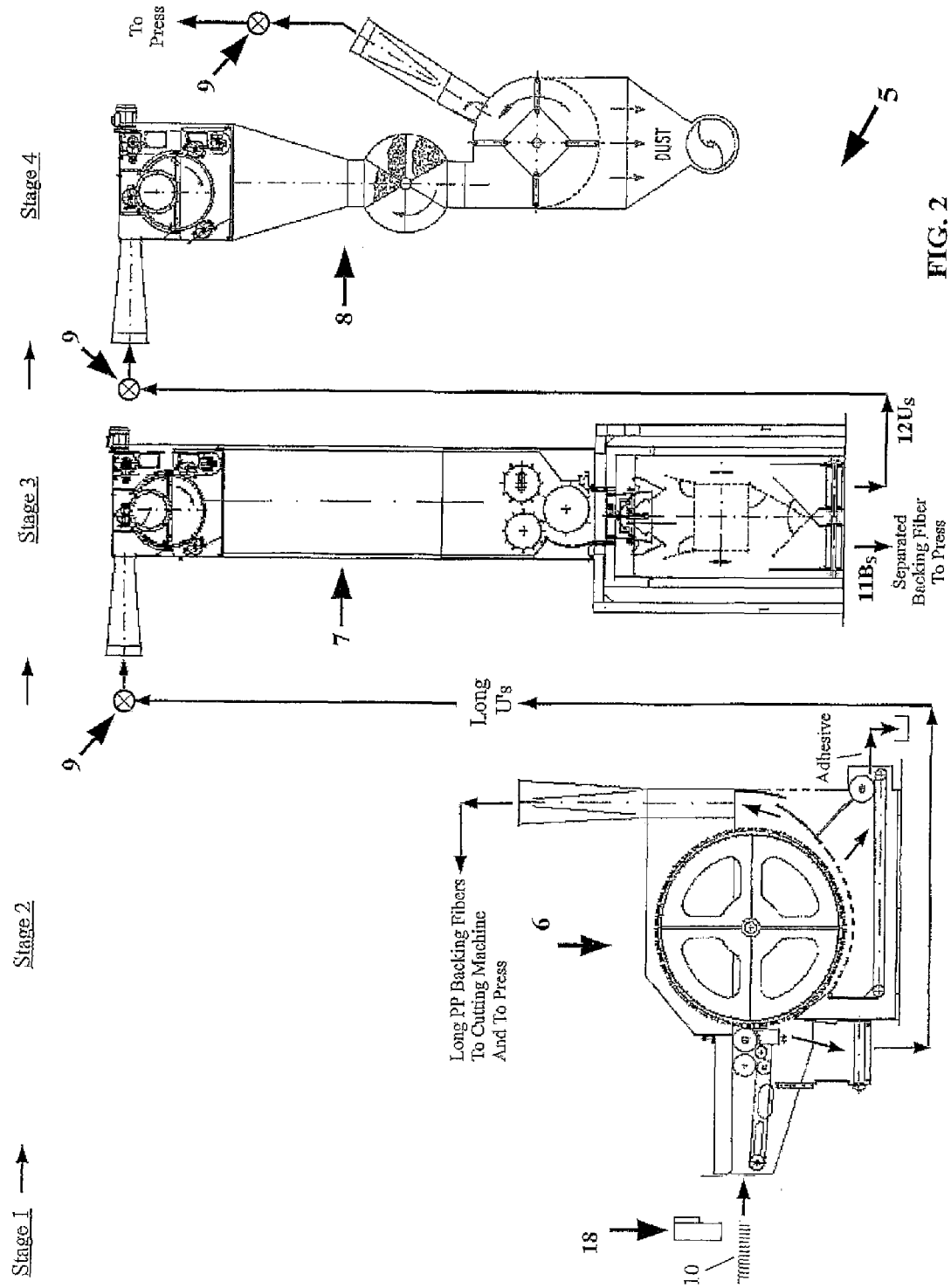
FIG. 2 is a side view showing the apparatus used at each stage of the recycling process in a second embodiment of the current invention, having a buffer silo in the third stage, and using a condenser at each of the third and fourth stages.

Carpet is made of dyed yarns, a primary backing onto which the yarn is attached or sewn, a secondary backing to provide strength and stability, and an adhesive to secure the yarn and to secure the primary and secondary backings together. The primary and secondary backing are mostly made from woven or nonwoven polypropylene, but the secondary backings may, in some instances, be made of kraftcord, cotton, or jute, which is a natural fiber that resembles burlap. The adhesive used to join the primary and secondary backings is usually a synthetic rubber latex that incorporates calcium carbonate to enhance viscosity and volume of the adhesive.

There are several ways to manufacture the carpet 10, including tufting, weaving, knitting, needle punching, fusion bonding, and flocking. In the United States, roughly 90-95% of the carpet is manufactured using a tufting machine. A tufting machine is basically a large sewing machine, usually 12 feet wide, and having between 800 to 2000 needles across the machine's width to insert loops of yarn into the primary backing. When the needles penetrate the backing, a hook, known as a "looper," grabs the yarn and holds it to create what is referred to as loop pile construction. In another style, the looper rocks to force the yarn against a knife, resulting in the cutting of the small loops of yarn, creating what is referred to as cut pile carpet. Next, a coat of adhesive is applied to the rear surface of the primary backing to secure the face yarn in place (the yarn protruding out from the front surface of the primary backing), and a coat of adhesive is applied to the secondary backing to secure it to the primary backing. The primary and secondary backings are then squeezed together using a heated press.

FIG. 1B shows a representative perspective view of a loop pile carpet 10L, while FIG. 1A shows a cut-pile carpet section 10, and the individual components that make up the piece of carpet. The carpet section 10 may have a primary backing 11P to which is secured the cut pile yarn, each of which may then be in the form of a "U" 12, and which has adhesive 13 applied on the back surface to secure the face yarn, and a secondary backing 11S which has adhesive 14 applied thereto. The two legs of the "U" that protrude from the face (front) of the primary backing may extend outwardly from the primary backing 11P to be any desired length.

As part of a recycling process, the majority of the face yarn may be sheared off, for example, to the height shown by dashed line 16 in FIG. 1A, or the carpet may be unsheared. Naturally, when the carpet is unsheared, the U's 12 to be recycled will be relatively longer, and conversely, if the face yarn has been sheared, then the U's will be shorter. In a conventional recycling process, the face fibers are removed by shearing for reuse, while the remaining portion, comprising the backing and remnants of the face fibers still secured thereto by the adhesive, are recycled as a composite material, which only has limited use and less value. Both phases of post consumer carpeting—the sheared pile and the unsheared pile carpeting—may be recycled using the apparatus and process disclosed herein. However, shearing of loop pile carpeting prior to processing by the apparatus disclosed herein, significantly improves the performance of the process.

The fiber of the carpet recycled by this apparatus and process may be any type of carpet material. Therefore, for efficient allocation of the recycled fibers to the end user, a first stage of the process may include having the carpet to be recycled, being sorted and then processed according to the chemical nature of at least the face yarn. The face yarn fiber may include, but not be limited to, nylon (nylon 6, nylon 6.6, . . . ), polyester, wool, silk, polyolefin, polyvinyl chloride, acrylic, etc. Each fiber type may be reliably and properly identified using a burn test. The burn test requires use of a butane lighter, as a butane flame is odorless, and will therefore not mask the odor of the burning fiber, which is one of the identifying burn characteristics of the fibers, along with color, disintegration type (burn/melt), etc. To better accommodate both accurate and rapid, on-the-fly fiber identification, a sensor 18 may preferably be used to accomplish spectroscopy.

The sensor 18, using near infrared reflectance (NIR) or Raman spectroscopy, may be used to identify the spectral signature of the particular polymer molecules of the carpet fiber currently being recycled by the apparatus. Near-infrared reflectance spectroscopy is a rapid and non-destructive technique that involves analysis of diffuse-reflectance measurements using light in the near infrared region (generally having wavelengths of 1000-2500 nm), where the reflectance depends upon the number and type of chemical bonds in the carpet material being analyzed. Raman spectroscopy is a spectroscopic technique that studies vibrational, rotational, and other low-frequency modes of a system, and relies upon inelastic scattering (Raman Scattering) of monochromatic light—light being in the visible, near infrared, or near ultraviolet range, and usually being from a laser. The laser light interacts with molecules in the system, with the result being that the energy of the laser photons are shifted up or down, which provides information about the material.

The sensor 18 may be a handheld sensor, or alternatively, the sensor may be affixed to a mechanical portion of an early stage, middle stage, or a later stage of the processing, to signal the type of carpet fibers being recycled in order to direct the material placement in appropriate storage bins or to be directed for further processing. One sensor usable therein, merely to be exemplary, is available from, and manufactured by, Axsun Technologies, Bilerica, Mass., (see technical data at www.axsun.com/html/products_spectroscopy.htm, the disclosures of which are incorporated herein by reference).

Figure 2A:
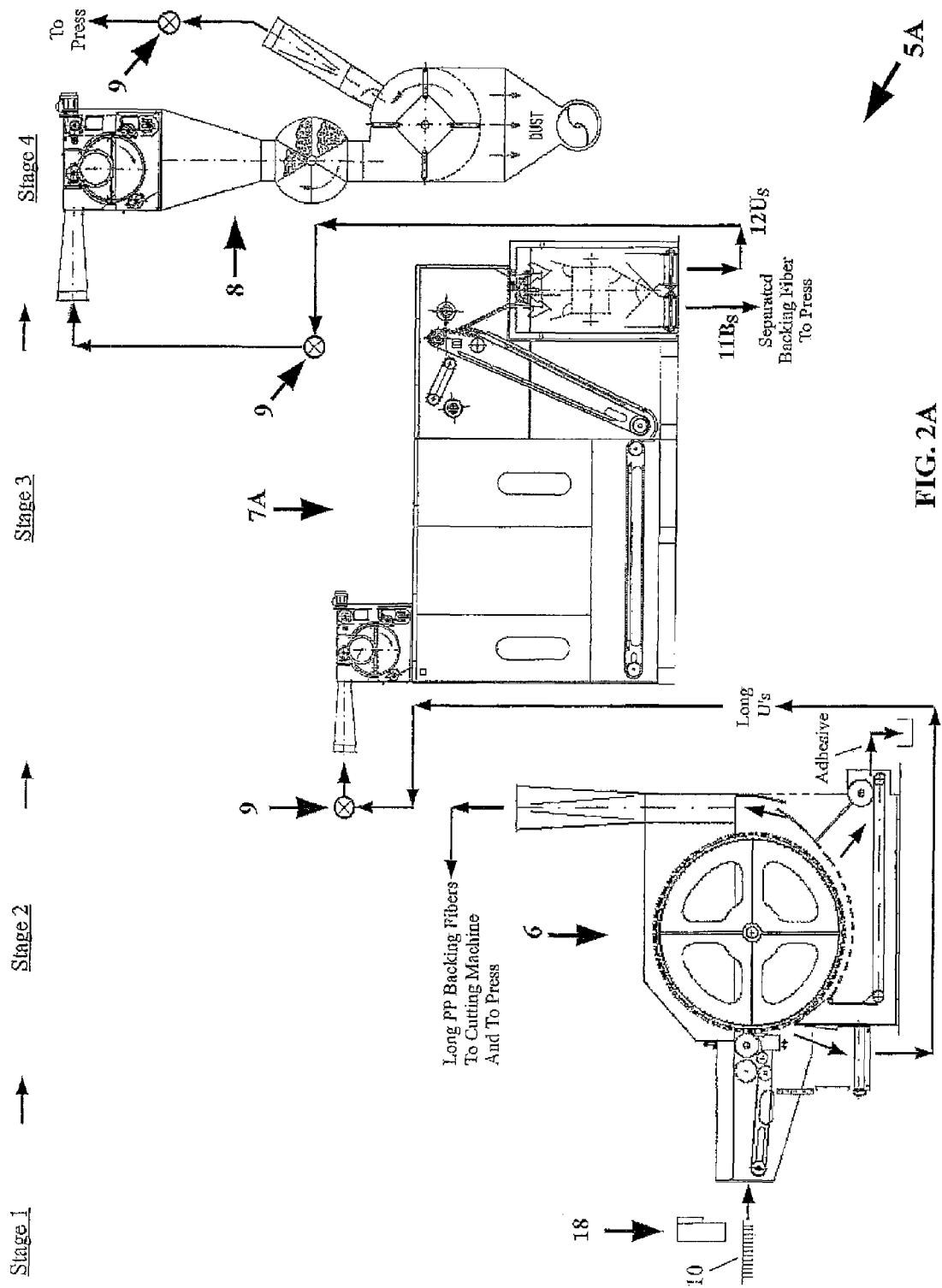
FIG. 2A is a side view showing the apparatus used at each stage of the recycling process in a first embodiment of the current invention, having a horizontal buffer arrangement, and using a condenser at each of the third and fourth stages.

FIG. 2 depicts apparatus 5 that forms a first embodiment of a recycling process according to the current invention, which includes a carpet fiber identification sensor 18 in the first stage, and which may further include a second stage apparatus 6, a third stage apparatus 7, and a fourth stage apparatus 8. Between each of the stages may be a willow cleaner 9. FIG. 2A illustrates an alternate embodiment 5A, having differences which will be discussed later.

Figure 3:
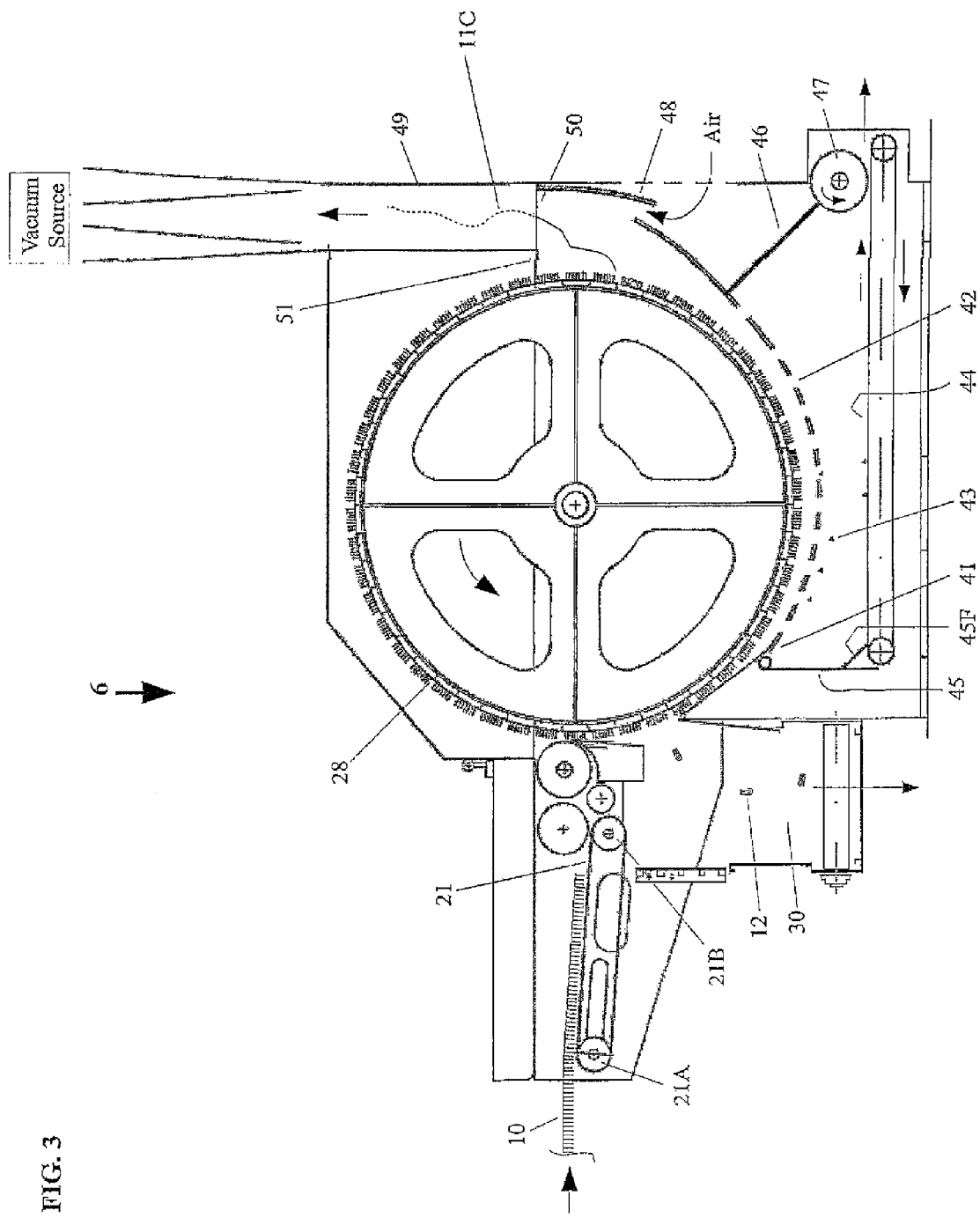
FIG. 3 is an enlarged view of the second stage apparatus of FIG. 2.

The apparatus 6 of the second stage is shown enlarged in FIG. 3. The second stage apparatus may be usable for mechanically separating a substantial portion of the pile fibers—the U's—from the backing, and although it is not required for successful operation of the recycling process herein, it may optionally include a carpet feed belt 21 that may be any suitable length or width, and in one embodiment may be roughly twelve feet wide to match the standard width of rolled pre-consumer carpet. The feed belt 21 eases the introduction of the carpet 10 into the apparatus 6. Therefore, the sections of carpet to be recycled using the present invention are not limited to narrow strips, and may instead be rolled up sections of 12 foot wide carpeting that may be unrolled as it is fed into the second stage apparatus 6. The carpet 10 to be recycled may be positioned on the feed belt 21 such that the face yarn is flush against the belt, while the backing 11 is distal from the belt and is upwardly exposed. This positioning of the carpet to be recycled results in the U's being hooked away by pins on a drum, as described hereinafter. The feed belt 21 may circulate about two belt support rollers, 21A and 21B.

Figures 4, 4A:
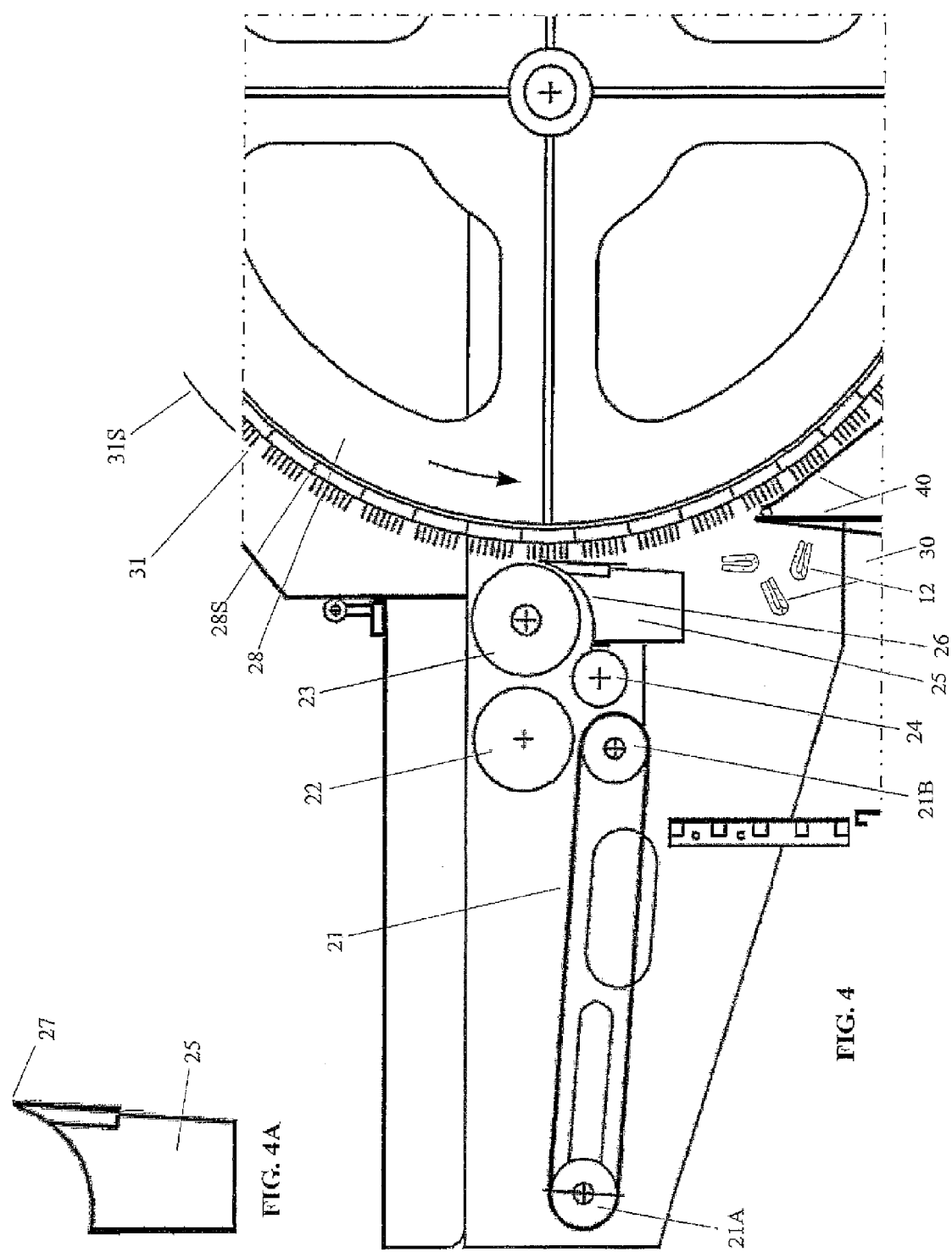
FIG. 4 is a detail view of a portion of the apparatus of FIG. 3.
FIG. 4A is an enlarged view of the feed dish of FIG. 4.

As seen in the enlarged view in FIG. 4, at one end of the feed belt 21 there may be a pressing roller 22 that keeps the carpet section positioned on the feed belt. The pressing roller 22 may be positioned near the end of the belt above the belt support roller 21B. The feed belt 21 assists in delivering the carpet section 10 to a pair of rollers, which may be nip rollers or feed rollers. In one embodiment, there may be a top feed roller 23 and a bottom feed roller 24. The top feed roller 23 and bottom feed roller 24 may direct the carpet section to a feed dish 25. The feed dish 25 preferably has a length corresponding to the axial length of the main drum 28. The feed dish 25 may comprise a curved surface 26, which generally conforms to the diameter of the upper feed roller 23. At the upper end of the feed dish 25 may be an edge 27 (FIG. 4A). The feed dish may serve to strongly hold the carpet between the top feed roller and the edge 27 of the edge itself, while the pins of the drum tear apart the carpet.

The drum 28 preferably rotates at a fairly high speed and on the order of more than 300 revolutions per minute (rpm), and more preferably at more than 400 rpm, and most preferably at between 500-600 rpm. These drum rotational speeds being used with, for example, a 56 inch drum, may easily permit a carpet feed rate of 13-20 feet per minute, and with an optimal pin configuration, carpet feed rates of 30-33 feet/minute may be reached or even exceeded. The drum 28 may be in the form of a cylinder of any suitable length and diameter. In the embodiment shown in the Figures, the drum 28 is roughly 56 inches in diameter, and may be 12 feet in length. The drum 28 may have a plurality of pins 31 extending outwardly from the cylindrical outer surface 28S of the drum. The pins 31 may generally be equally spaced about the circumference of the cylindrical outer surface of the 56 inch diameter drum, and may generally be equally spaced laterally across the outer surface, where laterally means in a direction being parallel to the axis of the cylindrical drum. The length of the pins may also be set so that each of the ends of the plurality of pins terminates at a cylindrical surface 31S, which may be a constant offset from the cylindrical outer surface 28S of drum 28. The curvature of the feed dish preferably has an end tangency being approximately tangent to this cylindrical surface formed by the plurality of pins.

The pins 31, as they rotate, along with the periphery of the main drum 28, may generally pass in close proximity to the edge 27 of feed dish 25, and the drum may be adjustable relative to the feed dish so as to be a particular distance away from the edge 27, depending on the type of carpet being recycled. At the edge of the feed dish 25, the carpet is forced downward by the rotation of the pins 31 on the main drum 28 to the edge 27 of the feed dish. The pins 31 grab onto the backing 11 of the carpet 10 and shred and tear apart the structure of the carpet backing, thus freeing the face yarn. The freed "U"s 12 which make up the face fiber is directed from the edge 27 toward the receptacle 30 where they are collected. Instead of receptacle 30, the U's may be ducted to a later stage for further processing, as discussed hereinafter.

The U's are directed downward, due to them being denser and shorter, and also because of the way the shorter U's are hit by the pins of the drum which tends to throw them tangentially away from the drum. The shredded backing tends to be less dense and longer, and because the rotation of the drum generates a fan effect, resulting in airflow towards the inside of the machine, the suction created draws the lighter backing material inside the pins and close to the outer surface of the drum itself, so that the shredded backing tends to be pulled along with the drum. The shredded backing may actually be a residual composite 11C of materials, being composed mainly of the primary and secondary backings, along with a small amount of adhesive and possibly some small pieces of the pile U's that were not completely removed from the backing due to the tenacity of the adhesive.

Even though the U's tend to be thrown down, a rejecting plate 40 may span the length of the main drum 28, and be positioned in close proximity to the pins 31 to facilitate maximum rejection by the spinning drum 28 of the carpet "U"s, to further enhance their natural tendency of dropping downward. The rejecting plate 40 may transition into a guide member 41 that may be curved to generally conform to the curvature of the periphery of the main drum 28. The guide member 41 may also be adjustable, so that it can be moved closer to the main drum 28 or further away, depending on the carpet being recycled.

Because of the shredding accomplished by the pins 31 of drum 28, some of the adhesive that originally secured the face yarn to the backing 12 of the pre-consumer carpet may become dislodged therefrom. This constitutes an opportune point to begin collection of the adhesive, which at this stage may merely be passive collection. The curved surface of the guide member 41 initially keeps the shredded composite backing 11C in position relative to the pins 31 of the main drum 28, so that they may be moved along for processing at the next stage of the operation, while perforations 42 in a portion of the guide member 41 create a grill through which pieces of adhesive 43 falling from the shredded composite backing 11C may drop. The pieces of adhesive 43 that fall, may fall through the grill perforations 42 into a bin, or may alternatively fall onto a conveyor belt 44, which transports the pieces to a collection bin.

As the shredded backing 11C moves with the main drum 28 and may furthermore be guided by guide member 41, the pins 31 extending outwardly from the surface of the main drum 28 pull the backing along the outer surface of the main drum, and eventually requires separation therefrom, as follows. The guide member 41 may terminate just beyond the beginning of a second guide member 48 to create an opening to permit the inward ducting of air into a chute 49. The chute 49 may be generally (though not completely) sealed against the main drum 28 using a seal plate 51, while the area below the guide member 41 may also be sealed by a seal plate 45 having a flexible portion 45F attached thereto, with it being loosely biased into contact with the top portion of the upstream end of the conveyor belt 44. The delivery end or downstream end of the conveyor belt 44 may be sealed by a seal plate 46 extending from the guide member 41 to be proximate to a sealing roller 47. The sealing roller 47 may generally be in contact with the top of conveyor belt 44, and rotates so that its periphery moves as does the conveyor belt.

A means of producing negative pressure creates a vacuum within the chute 49 that draws the shredded backing 11C away from the main drum 28 towards the opening 50 of the chute 49. The chute 49 may be used to transport the shredded composite backing 11C to a cutting machine and a press. Therefore, the invention herein may utilize either of or both, a mechanical system(s) of transport, as shown by the conveyor belt 44 and its associated rollers, and/or a pneumatic system of transport, as shown by the chute and vacuum pressure source. There are many detailed examples of a suitable pneumatic transport system, such as the one shown by expired U.S. Pat. No. 5,150,990 to Morimoto for "High Density Pneumatic Transport System for Use with Solid Materials," the disclosures of which are incorporated herein by reference. However, in general, pneumatic transportation of the carpet U's for further processing may be provided by the vacuum source in the successive stages, as described hereinafter.

The third stage apparatus may be usable for further mechanical separation of any remaining pieces of backing fiber from the pile U's, and also may be usable for separating any remaining adhesive. The apparatus 7 of the third stage is shown enlarged in FIG. 5, and may comprise a housing 60, an intake conduit 61, a condenser apparatus 62, a buffer silo 63, a buffer dispatch section 64, a weight pan section 65, a shaker pen section 66, and a shaker dispatch section 67.

One of the definitions of the word "condense" is "to become denser or more compact or concentrated." The operation of the condenser apparatus 61, being roughly analogous to the condensing of milk in which one or more operations performed on the milk includes removal of some of the water therefrom, herein essentially "condenses" the pile U's 12 by causing them to become more concentrated through the removal therefrom of the remaining backing fiber and remaining adhesive.

Separating the adhesive and any dust from the fiber and pile in the condenser portion 62 of the third stage may comprise a "semi-active" means of removal, in that it may seek to only remove, from the U's 11C, the pieces of adhesive and dust that have already become loose and dislodged from the backing, due to the shredding and the vacuum transporting of the composite material to the apparatus 7. Removal of the dust may serve to improve the purity and value of the reclaimed fiber, which will be represented by a corresponding reduction in the ash content in laboratory burn testing of the reclaimed fiber, which tests for the presence of impurities remaining in the recycled product (e.g., 93% nylon, 4% polypropylene, and 3% ash). Such ash resulting from burning tests may be derived from the presence of impurities such as dust, animal hair, latex, and calcium carbonate powder. Each of these materials are typically classified in the lab using the generic term of "ash," as each of them are undesirable because they can create problems in the later steps of extruding the reclaimed nylon by occluding the holes of spinneret's. Removal of much of the dust, adhesive, and other debris may be achieved in the following manner.

Figure 6:
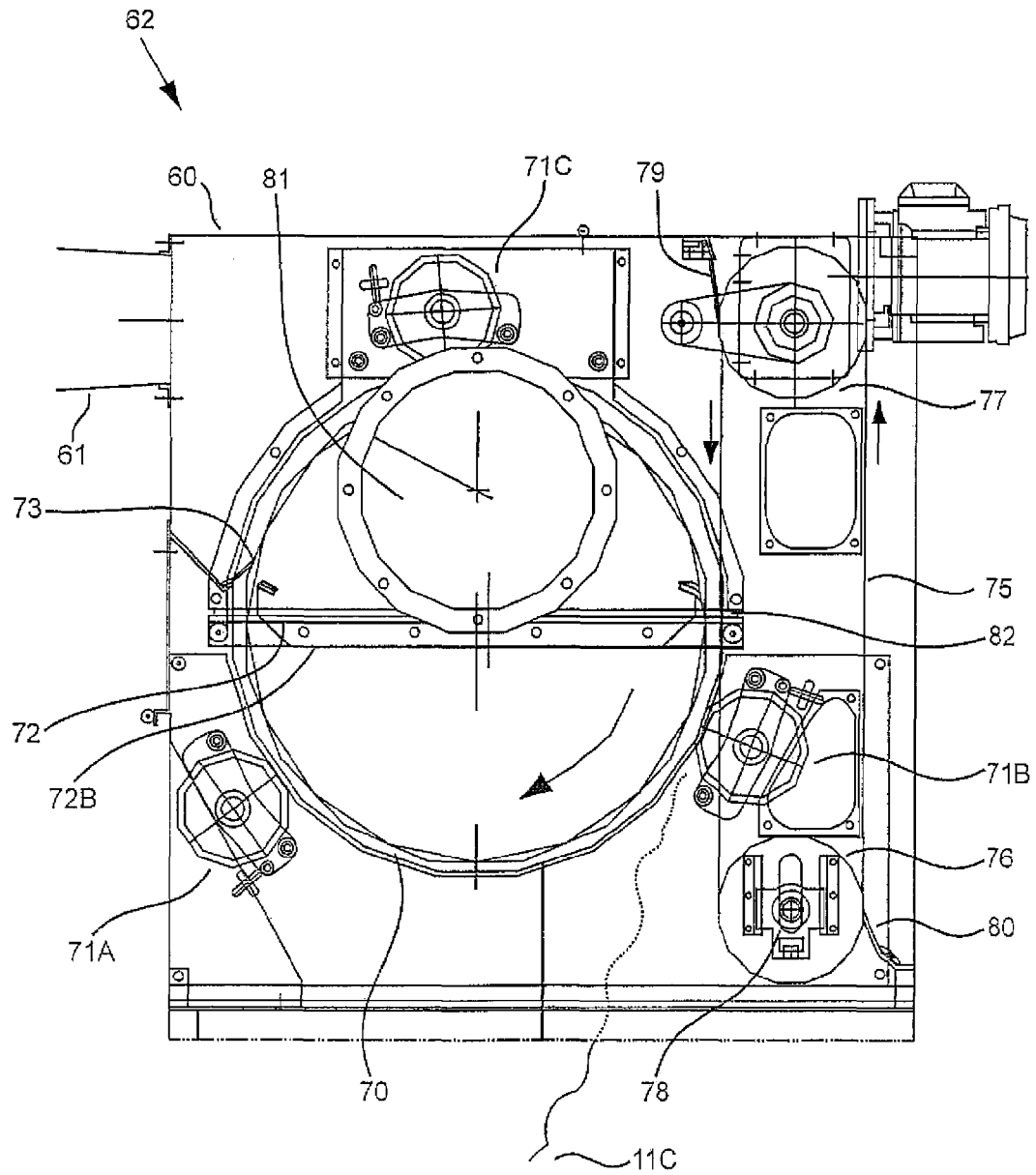
FIG. 6 is an enlarged view of condenser portion of the apparatus of FIG. 2.

The condenser apparatus portion 62 is shown enlarged in FIG. 6. The condenser apparatus portion 62 may comprise a perforated cylindrical squirrel cage 70 being rotatably mounted within the housing 60 using three or more rubber-coated wheels—71A, 71B, and 71C. The cylindrical squirrel cage 70 may be positioned to rotate about a segregation plate 72 that may be secured to the housing 60 using angle brackets 72B to be in a generally horizontal orientation, and be generally sealed relative to the housing against air leakage.

The cylindrical periphery of the squirrel cage 70 may also be sealed against air leakage relative to the housing 60 on opposite sides to partition the top cylinder-half of the squirrel cage from its bottom cylinder half One side of the squirrel cage 70, the left side as seen in FIG. 6, may be sealed using a flexible seal plate 73. The right side of the squirrel cage 70 may be sealed relative to the housing 60 using a continuous belt 75. The continuous belt 75 may be a flat belt that revolves around a first roller 76 and a second roller 77, being generally oriented in a vertical direction. The belt roller 76 may be caused to rotate by a shaft 78 connected to a gear box to cause the continuous belt 75 to revolve about the rollers 76 and 77, while the squirrel cage 70 may similarly be driven to rotate by a gear box, such that the speed of the continuous belt 75 at its periphery matches the peripheral speed of the rotating squirrel cage 70. The continuous belt 75 itself may be generally sealed relative to housing 60 by a flexible seal plate 79 being disposed on the upper inside portion of the belt, while another flexible seal plate 80 is disposed on the lower opposite (exterior) side of the belt. A duct 81 may connect to the housing 60 to be within the upper cylindrical half of the squirrel cage 70, and thereby provide a source of negative pressure therein.

The condenser apparatus portion 62 operates by having the U's 12 and pieces of adhesive already dislodged therefrom, admitted through the inlet conduit 61 to be drawn to the squirrel cage 70 by the negative pressure. The loose pieces of adhesive will be drawn through the openings (perforations) in the cylindrical surface of the squirrel cage 70, to be collected in a bin. The U's 12, being too large to pass through the perforations, will adhere to the exterior surface of the squirrel cage cylinder 70 while on the upper cylindrical-half of the cage, due to the negative pressure. As the cage rotates, the U's 12 will pass through the interface 82 where the belt contacts the squirrel cage, which is immediately outside of where the squirrel cage is sealed against the partition plate 72. Thereafter, the U's 12 will no longer be drawn against the cylindrical surface of the cage, as the lower cylinder half of the cage is only subjected to atmospheric pressure, and the U's will naturally tend to fall down into the buffer silo 63. Separation of the U's from the cylindrical surface of the squirrel cage may be aided by a scraper plate. The buffer silo 63 may be a generally open vertical section within the housing 60 to provide storage space for the U's until they may be further processed. This vertical buffer silo 63 may be advantageously utilized over the other arrangement described hereinafter, where floor space is at a premium, and where there is adequate height in the facility for the silo. Where it may be desirable, the U's may be drawn by the vacuum of the condenser, directly from the first stage into the buffer silo 63, without being processed by rotation of the U's upon the squirrel cage.

As seen in FIG. 4, a shaker pen section 66 may be of a limited volume, which may only be filled part way with U's 12 to be more effective; therefore, a weight pan 65 may be used to deliver a set amount of backing to be processed by the shaker box in a given processing cycle. To regulate the flow of U's 12 onto the weight pan 65, the buffer dispatch section 64 may be comprised of a series of paddle wheels. In one embodiment, seen in FIG. 7, the buffer dispatch section 64 may be comprised of a main paddle wheel 90, having a plurality of paddles blades 91 protruding therefrom. Alternatively, rather than paddles, pins may be used on the wheel. The main paddle wheel 90 may be disposed within a necked-down region of the housing 60 that is formed by an interior housing wall 60A and an interior housing wall 60B. Immediately above the main paddle wheel 90 may be a first upper paddle wheel 92 having a plurality of paddles blades 93 extending therefrom, and a second upper paddle wheel 94, having a plurality of paddles blades 95 protruding therefrom.

Without rotation of the paddle wheels, the necking down of the housing and the further obstruction cause by the paddle wheels themselves will essentially block the shredded U's 12 and cause them to generally clump and accumulate within the buffer silo 63. When the shaker pen 66 is ready to accept more material for processing, the paddle wheels 90, 92, and 94 may appropriately rotate, and through the action of the paddles blades thereon, the U's 12 are directed to pass through an opening 60C in the housing 60, from which they may freely fall onto the weight pan section 65.

Figure 5:
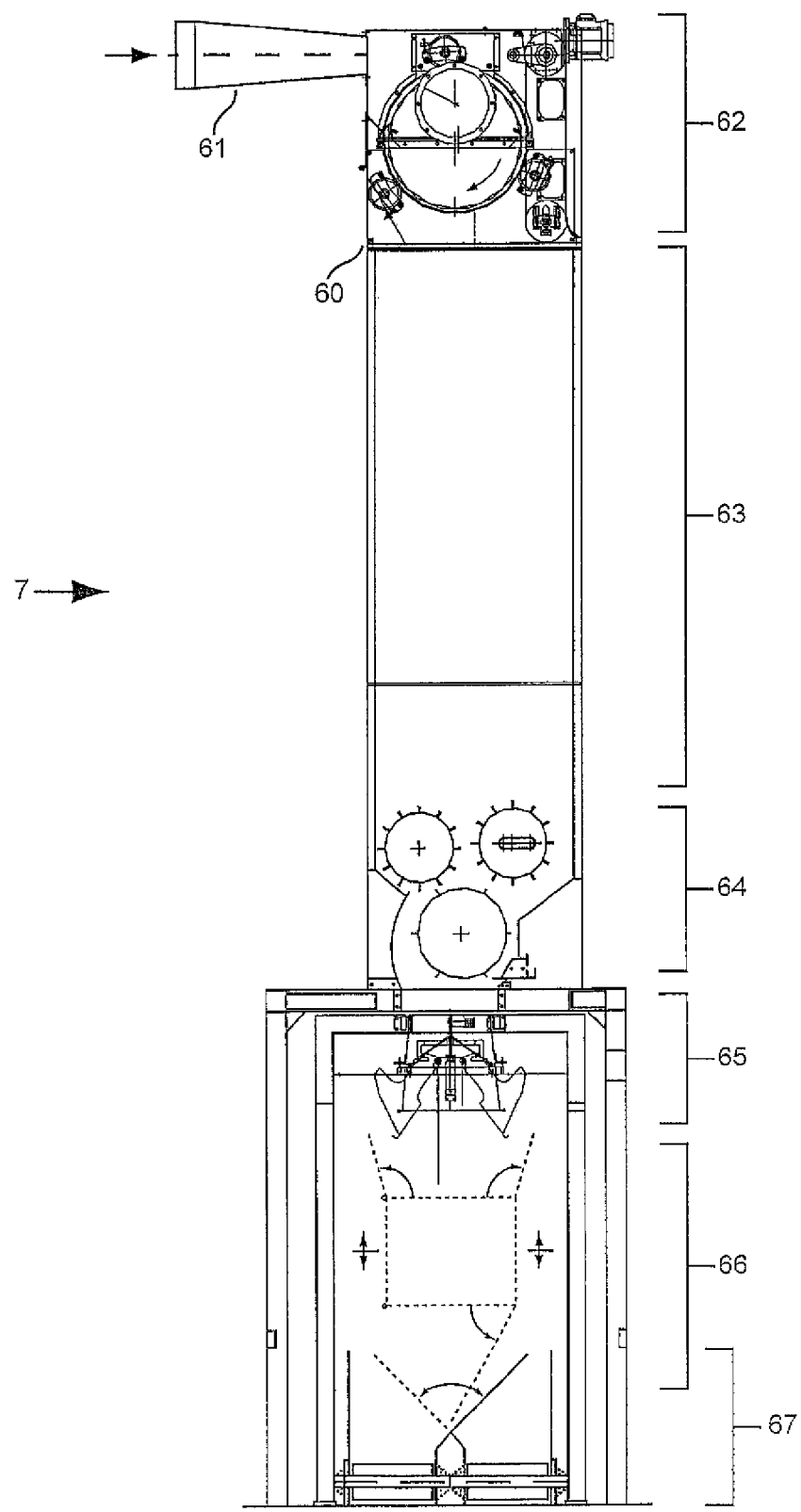
FIG. 5 is an enlarged view of the third stage apparatus of FIG. 2.
Figure 7:
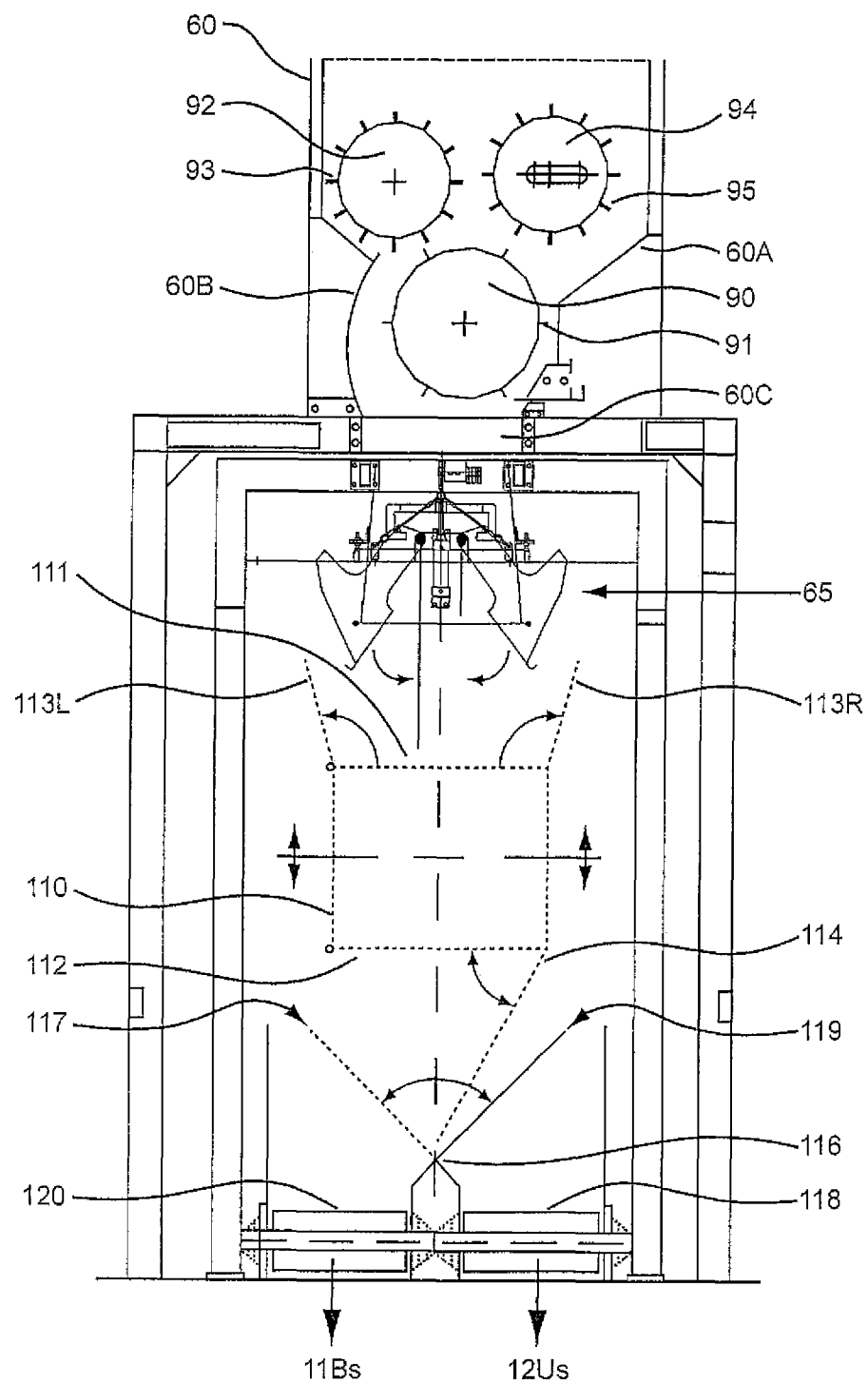
FIG. 7 is a detail view of the apparatus of FIG. 5 below the hopper section.
Figure 8:
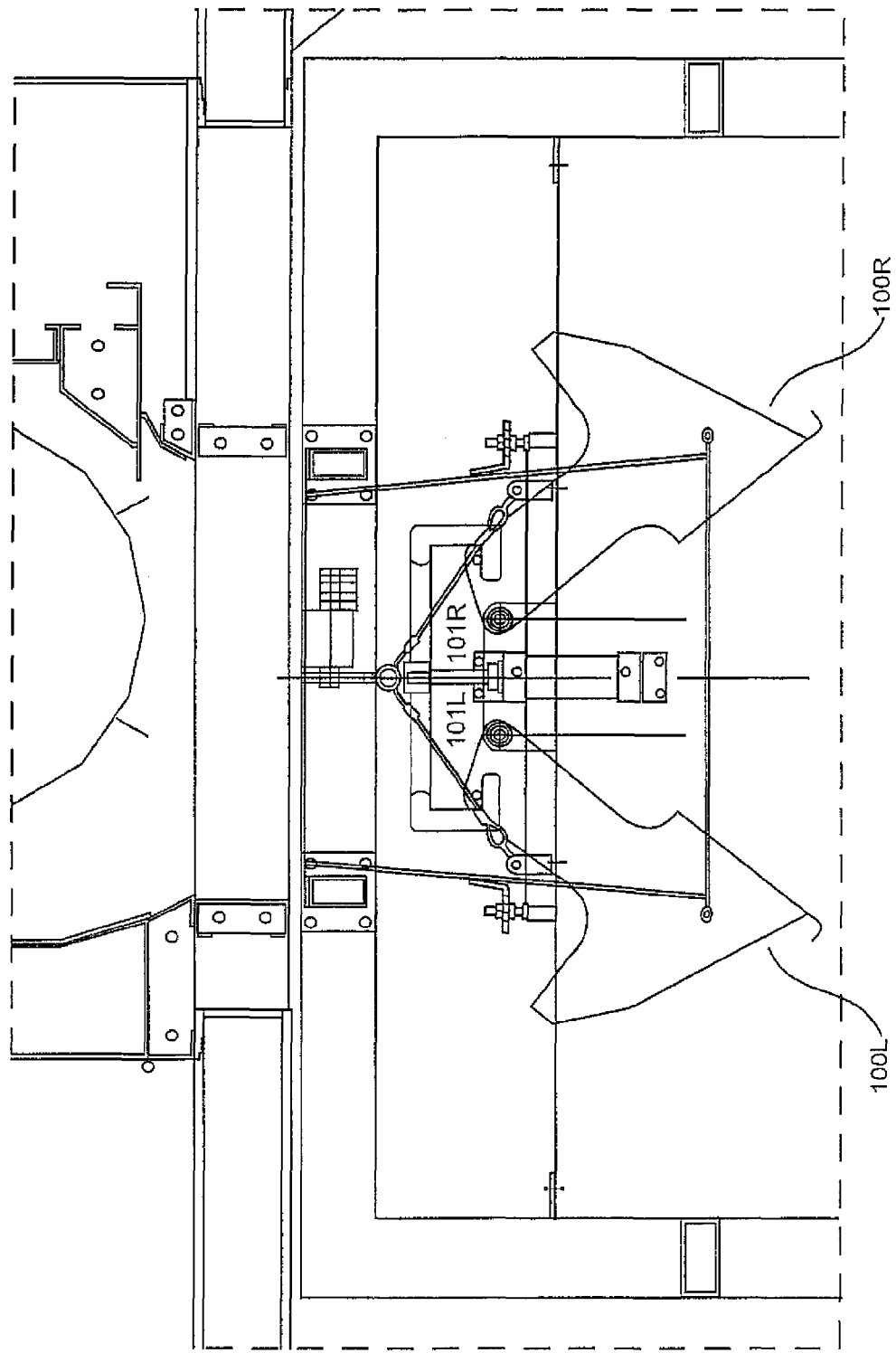
FIG. 8 is an enlarged view of the weight pan portion of the apparatus of FIG. 5.

The weight pan section 65 is seen within FIGS. 5 and 7, and is shown enlarged in FIG. 8. The weight pan section 65 comprises a pair of arms 100L and 100R, each of which may be angled towards the common edge where the meet. The arms 100L and 100R may be pivotally mounted at points 101L and 101R, and may be counter balanced with a specific weight corresponding to the weight of shredded composite backing 11C that may ideally be processed within the shaker pen 66 during a cycle. When that set amount (weight) of material has fallen onto the aims 100L and 100R, the arms may be forced apart under the material's weight, so that the material drops down into the shaker pen 66. In an alternate embodiment of the weigh pan, two pneumatic cylinders may cause the aims 100L and 100R to open to permit the fibers to fall into the shaker pen. The paddle wheels 90, 92, and 94 may also be signaled at that time by a proximity sensor to stop them from turning, so that no more material is passed through opening 60C and dropped onto the weight pan portion 65. The proximity sensor may detect the position of the arms 100L and 100R, as they begin to open. Instead of proximity sensors, the weight pan may be connected to electronic load cells that may be used to shut off the paddle wheels once the preset amount of weight has been received onto the pan. After the material is dropped, the counter-balanced arms 100L and 100R, free of the weight of the backing material, may then simply pivot back into the closed position, or they may be pneumatically driven thereto. While the shaker pen processes the weighed amount of material, the U's 12 may continue to collect within the hopper.

The shaker pen portion 66, although shown to be a rectangular box in the figures, may in fact take any suitable form, and could alternatively be, for example, a cylindrical enclosure. The shaker pen portion 66 may be formed of one or more walls 110 to have an open top 111 and an open bottom 112. The open top 111 may be covered using a pivotable cover. As seen in FIG. 7, the pen may be located in closer proximity to the bottom of the weight pan through the use of two smaller pivotable doors 113L and 113R, which may be pneumatically actuated. The bottom opening 112 may be secured by a pivoting mesh 114. The one or more walls 110 may also be made of a mesh. With the mesh 114 secured in the bottom opening 113, and with the weighed amount of U's 12 having been dropped into the shaker pen 66, as previously described, the top covers 113L and 113R may be closed to seal the shaker pen except for the openings in the mesh.

The shaker pen 66 may now be shaken using a mechanical shaker. The shaker pen 66 may be shaken mechanically to move up and down in the vertical direction, or in a side to side direction, or in the front to back direction, and preferably in a combination of such vibratory motion. The shaker pen 66 may also be able to rotate about an axis. Shaking of the U's 12 causes the remnant backing fibers to separate from the U's. Because the separated U's 12U$_S$ tend to be much smaller than the separated backing 11B$_S$, they will be delivered out through the openings of the mesh, which are specifically sized to be just large enough to only permit passage there through of the expected U's. The mesh walls and pivoting mesh bottom may be made of a framed screen material having appropriate sized openings, where the framed screen may be replaceable with framed screening having a different size for different types of carpeting—pile heights. The shaker pen 66 may preferably be shaken for a set period of time that has been shown to be necessary to optimally separate a large percentage of the U's from the remaining longer backing fibers.

During the shaking portion of the process, the separated pile U's 12U$_S$ falling through the mesh 114 may be directed by a deflector plate 116, which then occupies a first position 117, in a first direction to enter a first conduit 118. When the shaking period ends, the deflector plate 116 may pivot to occupy a second position 119, and the mesh 114 may pivot away from the bottom 112 of the shaker pen 66 to permit the separated backing fiber 11B$_S$ to be deflected into a second conduit 120.

Figure 10:
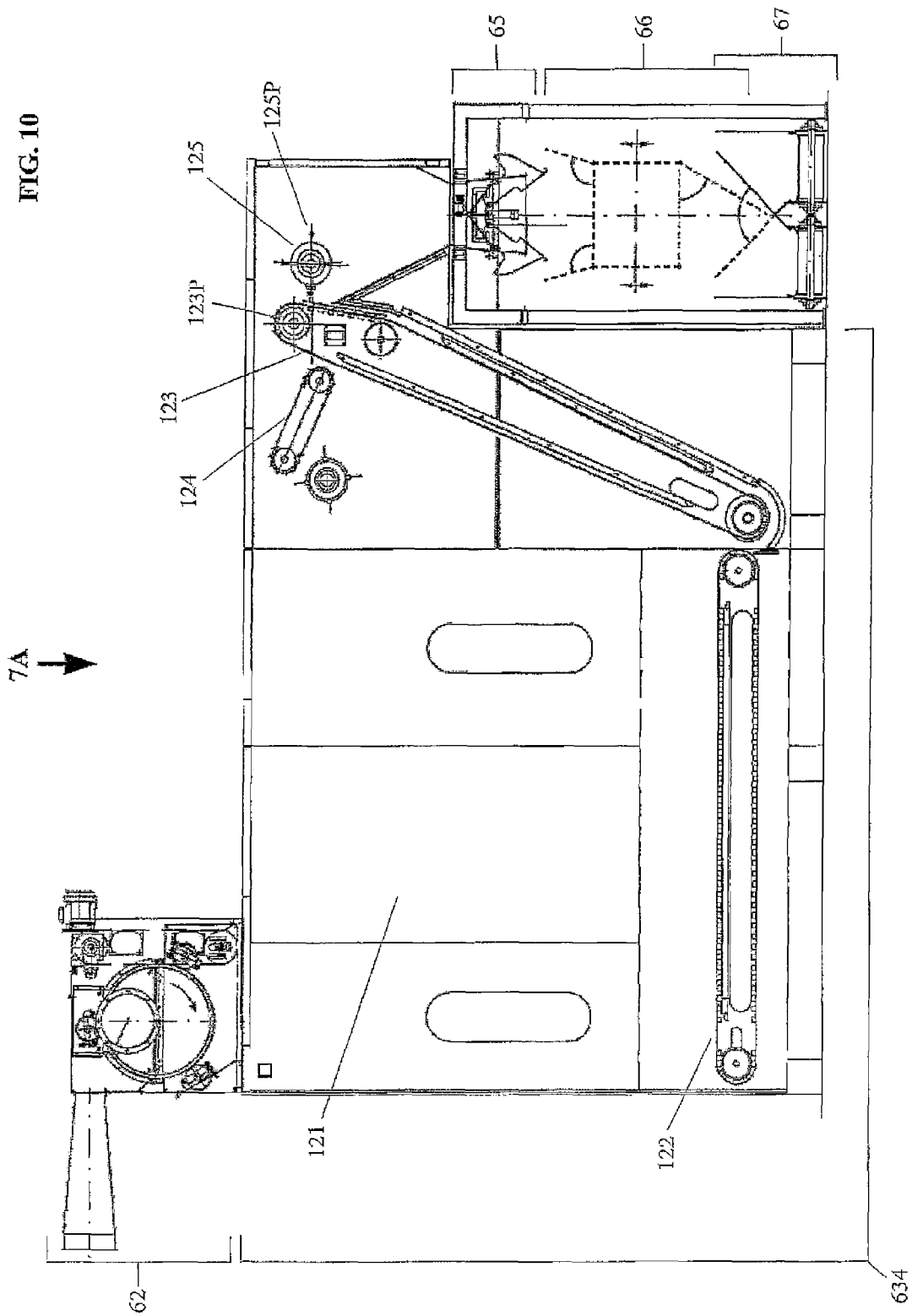
FIG. 10 is an enlarged view of the third stage apparatus of FIG. 2A.

The alternate embodiment 5A of the current invention that was previously mentioned, and is shown in FIG. 2A, may be configured the same as the afore- and hereinafter-discussed embodiment 5, except that apparatus 7 may be replaced by apparatus 7A. A comparison of apparatus 7 in FIG. 5 and apparatus 7A in FIG. 10 reveals that they may be the same, except that the vertical buffer silo 63 and buffer dispatch section 64 are replaced by a more generally horizontal conveyor-buffer arrangement 634. In the conveyor-buffer arrangement 634, the U's that drop from the condenser 62, may fall into a buffer collection area 121, which may be atop a conveyor belt 122. The U's may be collected in the buffer collection area 121 until more material needs to be delivered to the weight pan 65. When the U fiber material is needed, the horizontal conveyor-buffer arrangement 634 may be activated. When the horizontal conveyor-buffer arrangement 634 is activated, the first conveyor 122 belt may serve to direct the U's toward the second conveyor belt 123, which may transport the fibers upwardly by using a series of pins 123P or paddles protruding out from the belt. Near the top end of belt 123 may be a roller-mounted belt 124 and a roller 125. The roller-mounted belt 124 may preferably be equipped with a plurality of paddles or pinned bars or brushes on the outer surface, and may revolve in the opposite direction as does the conveyor belt 123, thus serving to reject the excess fibers resting upon the conveyor belt and to send them back into the buffer collection area 121. The drive roller 125 may similarly have a plurality of paddles or pins 125P, but may rotate in the same direction as the conveyor belt 123, and may rotate at a higher speed, so that its paddles or pinned bars or brushes will doff the fibers off from the conveyor belt and throw them down into the weigh pan 65.

Upon leaving either apparatus 7 of apparatus 7A, the separated U's 12U$_S$ may as yet undesirably have adhesive still attached thereto. Therefore the separated U's 12U$_S$ in the first conduit 118 may be directed using negative pressure to a fourth stage apparatus 8, which supplies the negative pressure (from a condenser therein), while the separated backing fiber 11B$_S$ may preferably be directed to a press.

Figure 2B:
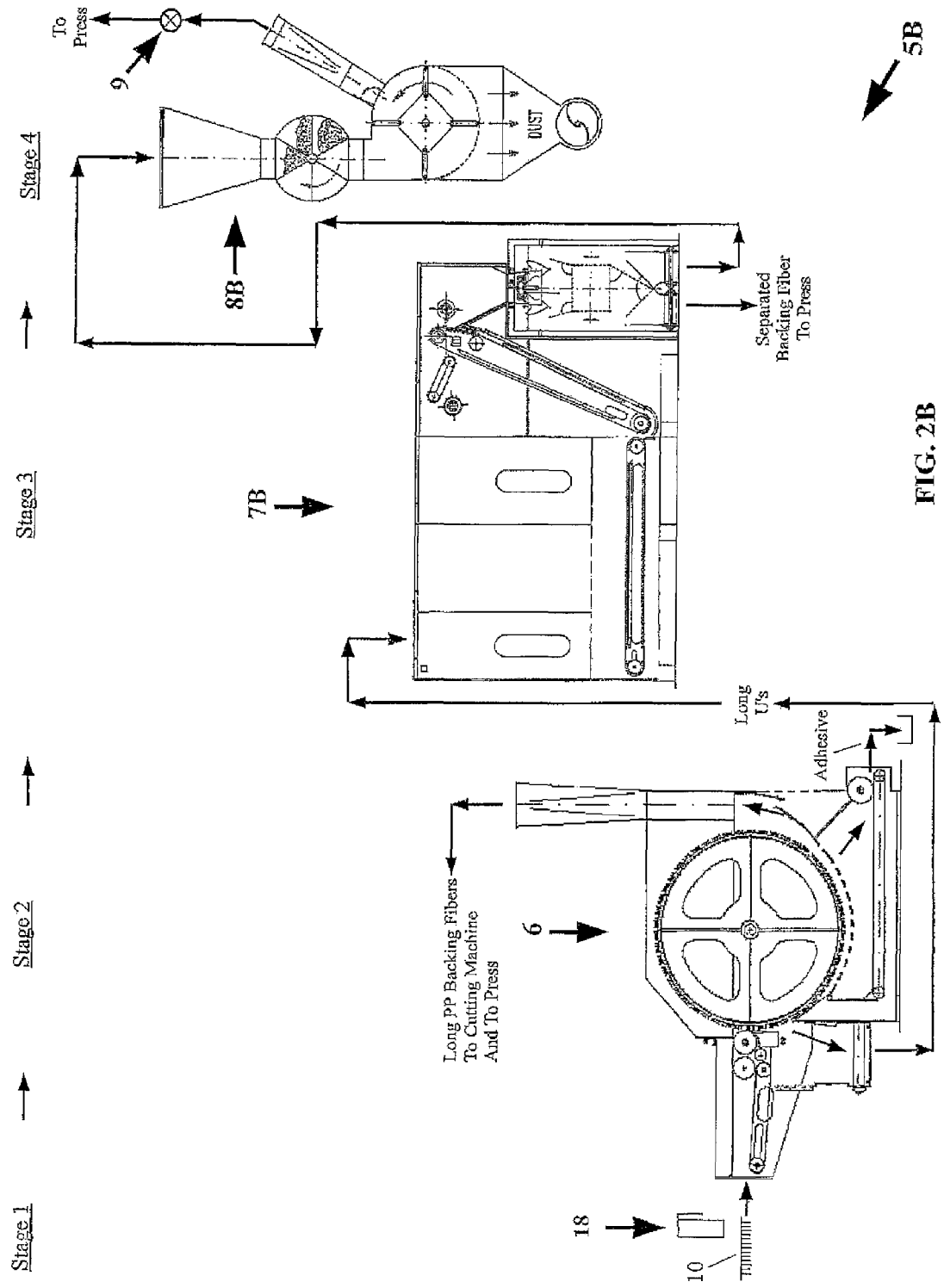
FIG. 2B is a side view showing the apparatus used at each stage of the recycling process in a third embodiment of the current invention, having a horizontal buffer arrangement, and being without use of a condenser prior to the third and fourth stages.

Apparatus 8 may comprise a condenser portion 62A being constructed and operated substantially the same as the condenser 62 previously described. The separated U's 12U$_S$, once passing through the condenser 62A, may be stored in a hopper section 103. (Note—in another alternate embodiment 5B, seen in FIG. 2B, the process may be the same as for apparatus 5A of FIG. 2A, except that condensers 62 are not utilized for removal of loose adhesive, which may instead fall through a grill in the conveyor 122, and/or be separated and removed at a later stage). Below the hopper section 130 may be star valve 135. The star valve may be used to perform several different functions. The star valve 135 may comprise a plurality of rotating chambers, as described hereinafter that may initially function to receive the separated U's 12U$_S$ for delivery into the fibermill while simultaneously preventing dust generated in the milling of the fibers from coming out of the machine. At the same time, the star valve may accomplish volumetric measuring for constant metering of only a specific volume of separated U's into the fibermill.

The star valve 135 may have an upper opening 136 for receiving the separated U's 12U$_S$ from the hopper 130 into the valve. The star valve 135 may comprise one or more rotors that rotate in the body of the star valve. The rotors can be driven by a chain and pinion system or by a direct motor drive. The rotors of the star valve 135 may be spaced/positioned so that at least two rotors may always touch the interior surface 137 of the valve chamber to keep separate any pressure differential between the hopper section 130 and the fibermill, and also thereby prevent dust generated from escaping.

Figure 9:
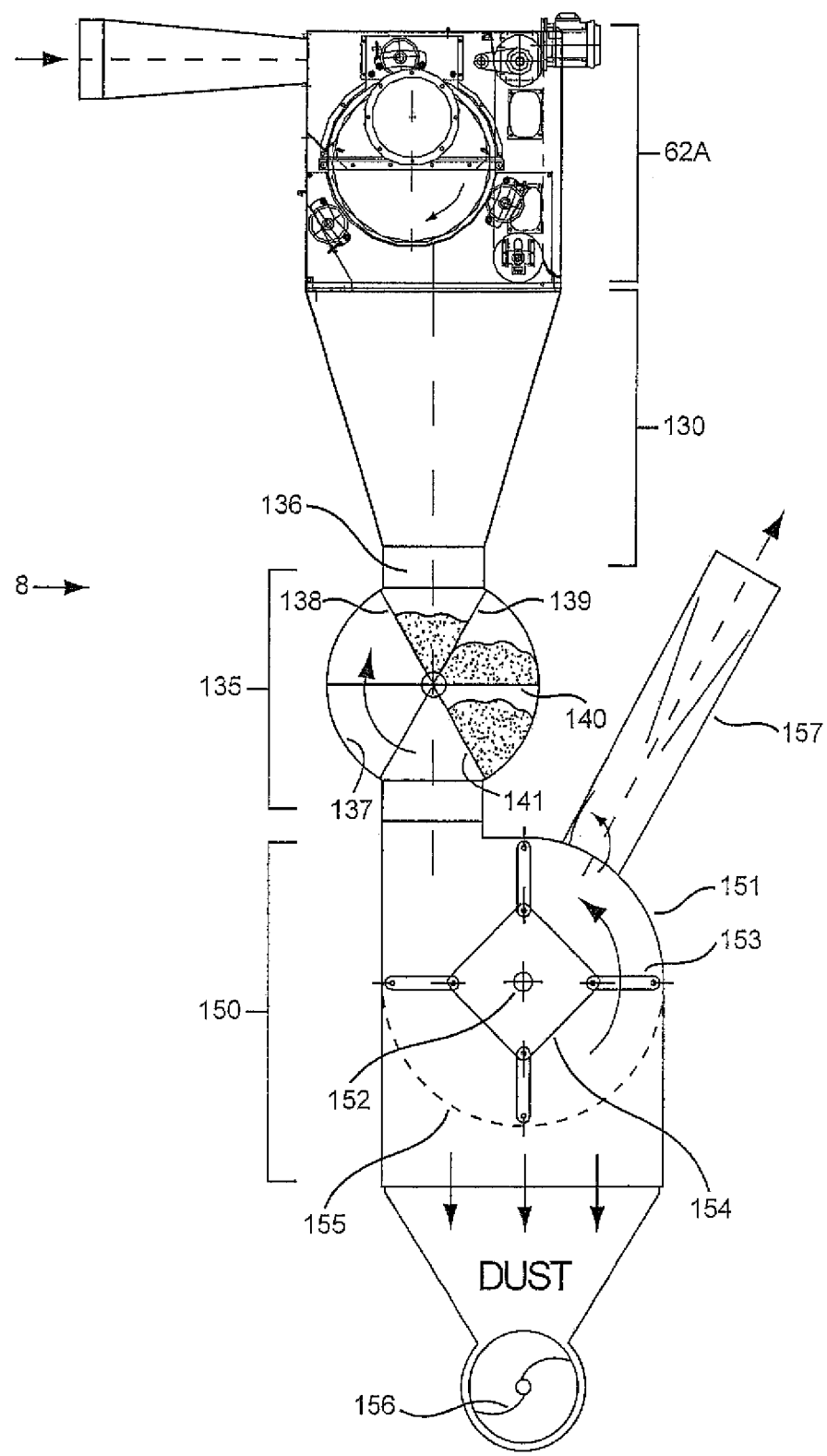
FIG. 9 is an enlarged view of the fourth stage apparatus of FIG. 2.

In one embodiment, there may be six rotors being equally spaced about an axis, as seen in FIG. 9. Thus, the star valve 135 may also be set up to rotate in 60 degree increments, so as to always leave a first rotor 138 and a second rotor 139 positioned immediately before and immediately after the opening 136. Alternatively, the rotors on the axis may rotate constantly at a specific rotational speed. Either feeding arrangement permits only a measured volume of material to enter the chamber between those two rotors. In this way, as the star valve 135 rotates, only the metered volume of material contained within the chamber partitioned by rotors 140 and 141 is delivered into the fibermill 150 for a processing cycle.

The rotational speed may therefore be in sync with the time necessary to process a sufficient amount of the fibers.

The fibermill 150 serves to crush any adhesive remaining on the separated U's. A normal fibermill works with a continuous flow of material into the machine. For example, a typical fibermill process may seek to crush rocks being 10" by 10" into stones being no greater than 1.0"×1.0", and does so by using a steel grate at the bottom which has one inch openings. In this way the rocks fed into the machine keep being broken by the hammers within the fibermill until they reach dimensions smaller than 1.0"×1.0", at which time they fall out of the fibermill chamber through the holes of the grill, but while new material at the larger dimensions is continuously fed into the machine. However, this would not process the separated U's $12U_S$ properly, therefore, the fibermill of the current invention has been specially adapted and successfully utilized in a process that works in cycles, as follows The fibermill 150 may preferably comprise a cylindrical drum portion 151 containing a motor driven, rotating shaft 152, and hub 154, upon which hammer bars 153 are mounted. The hammer bars 153 may be fixed, or may be free to swing relative to the hub 154. As the shaft 152 spins, the material from a partitioned chamber of the star valve 135 is fed into the drum by the 60 degree rotation, after which the fibers are impacted by the hammer bars 153, and the adhesive attached thereto is crushed and removed from the fibers. The hammers may crush the fibers against a portion of the bottom of the drum that may contain a plurality of openings that form a grill portion 155. The grill 155 may comprise different shaped openings, i.e. square, round, etc. However, the size of the openings, which may be on the order of ⅛th of an inch to ¼th of an inch, are set so as to permit the passing of the crushed adhesive, while still retaining the pile fiber therein. Below the grill may be a dispatch opening and an auger 156 to remove the crushed adhesive and dust. There may alternatively or additionally be a conveyor belt below a dispatch opening to carry away the crushed adhesive.

The time that the fibermill operates upon the material is significant; because it has been determined that excessive hammering may cause the carpet fibers to also be broken down in size, to the point where they may also pass through the openings in the grill 151, along with the crushed adhesive. So the timing of the cycle is carefully monitored and related to the amount of material being processed at one time. When the preset time for processing has been reached, an air cylinder opens one or more doors, and a calculated amount of negative pressure is applied to the exit conduit 157 to draw out the clean carpet U fibers, after which the doors are closed and another lot of separated U's $12U_S$ are dropped into the chamber.

The separated fibers from the post-consumer carpet—the pile fiber and backing fiber—may thereafter be delivered for further processing, which may include baling, pelletizing, or agglomerating. The crushed adhesive, and any dirt and dust that may have been encrusted in the carpet and were separated therefrom, are commonly discarded, but could potentially be subjected to further recycling processes.

Figure 11A:
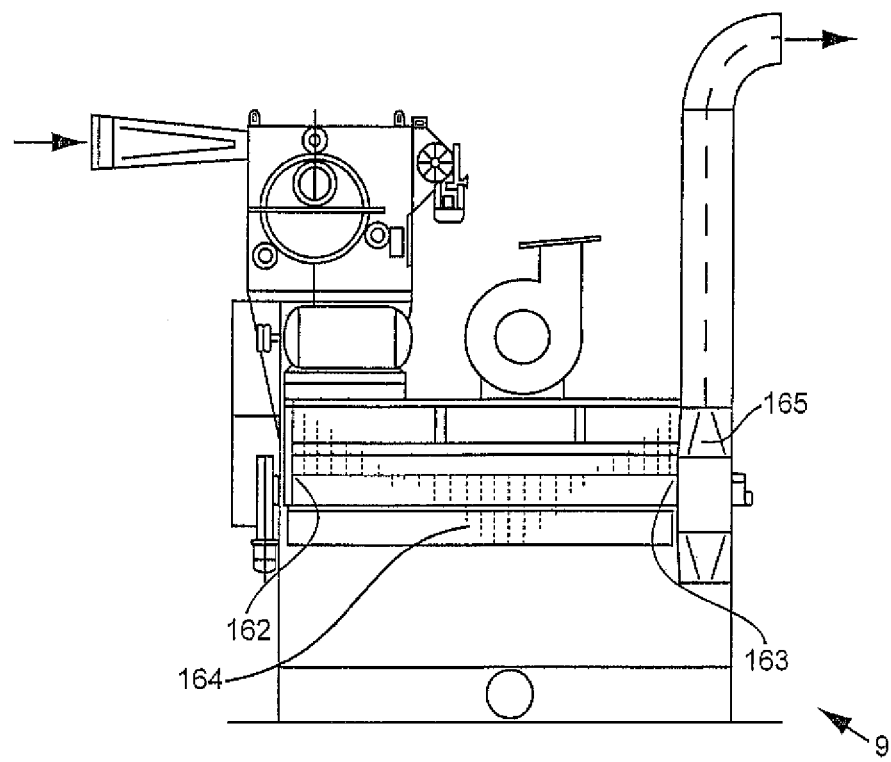
FIG. 11A is a front view of the willow cleaner of the current invention.
Figure 11B:
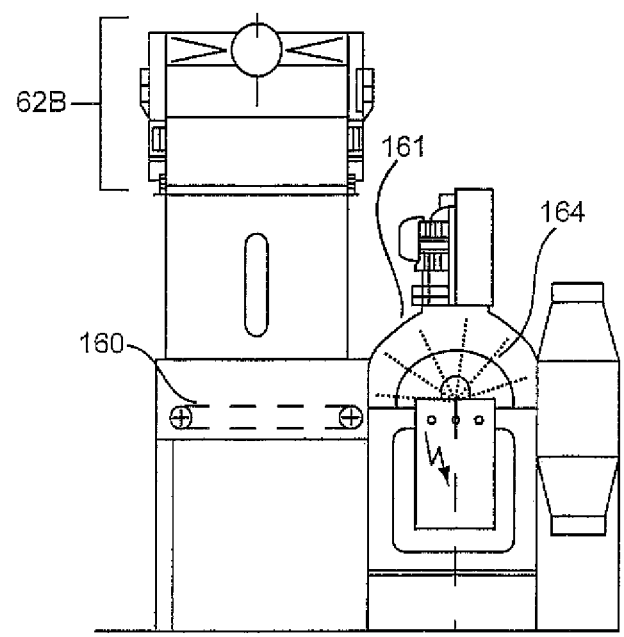
FIG. 11B is a side view of the willow cleaner of FIG. 11A.
Figure 11C:
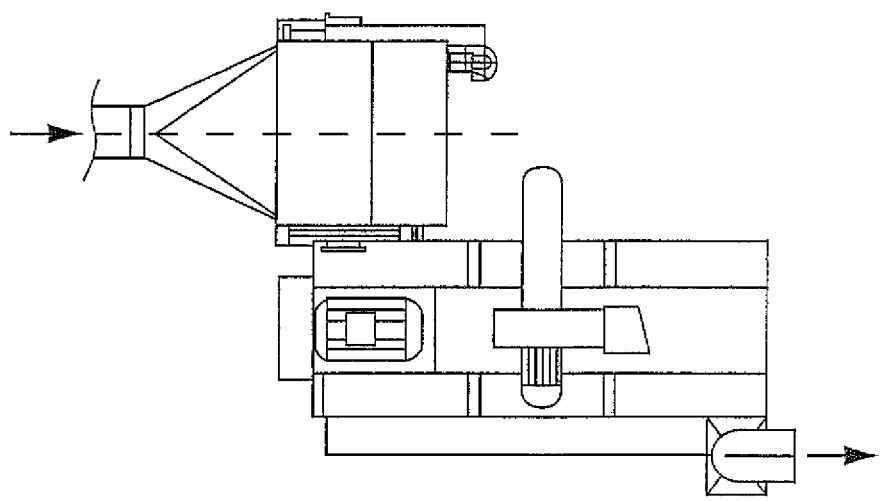
FIG. 11C is a top view of the willow cleaner of FIG. 11B.

As stated earlier, prior to each of the third and fourth stages, and even after removal from the fibermill, the U's may be subjected to treatment by a willow cleaner 9, which is only represented schematically in the overall processes shown within FIGS. 2 and 2A, but is illustrated in detail in FIGS. 11A-11C. The willow cleaner machine 9 initially accepts the separated U's into a condenser portion 62B being constructed and operated substantially the same as the condenser 62 previously described. The U's falling off of the squirrel cage of condenser 62B may drop onto a conveyor belt 160. The conveyor belt 160 may deliver the U's into the heart of the willow cleaner machine 9, which is formed essentially of a horizontal cylinder 161 with the inlet at the beginning of a first end 162, and the outlet at the second end 163 on the opposite side. Inside the chamber of the cylinder 161 may be a shaft mounted along the cylinder's axis and having spokes 164 positioned in a spiral form so that during their rotation they sequentially rotate around the inner surface of the cylinder and shake the U fibers that are being fed therein, and simultaneously the spokes 164 also push the U fibers towards the second cylinder side 163 by the outlet opening 165. The bottom part of the cylinder may be made of perforated sheet metal which has, underneath, a transition connected to a suction fan. The fan creates negative pressure which is exerted through the holes of the perforated screen, so that all the dust and small impurities generated in the shaking of the material inside the cylinder are sucked down into the transition and through the fan, and are delivered into a filtering and collecting system. The cleaned U fibers, as soon as they reach the delivery opening at the end of the chamber 165, are thrown out and sucked into the ductwork by the feed condenser (62 or 62A) installed on the following machine.

The examples and descriptions provided merely illustrate a preferred embodiment of the present invention. Those skilled in the art and having the benefit of the present disclosure will appreciate that further embodiments may be implemented with various changes within the scope of the present invention. Other modifications, substitutions, omissions and changes may be made in the design, size, materials used or proportions, operating conditions, assembly sequence, or arrangement or positioning of elements and members of the preferred embodiment without departing from the spirit of this invention.

What is claimed is:

1. A carpet recycling apparatus, for use in mechanically separating a substantial portion of pile U's from the backing of post-consumer carpet, said apparatus comprising:

means for mechanically separating the pile U's and the backing of the carpet into a first separated portion comprising substantially the backing with residual pile U fibers and remnant adhesive attached thereto, and into a second separated portion comprising substantially the pile U's with residual backing fibers and remnant adhesive attached thereto;

means for transporting the pile U's with residual backing fibers;

a hopper comprising a first opening and a second opening, said first opening configured to receive the pile U's with residual backing fibers from said transport means;

one or more paddle wheels rotatably disposed in said second end of said hopper, and configured to substantially block egress of the pile U's from said second opening when static, and further configured to assist egress of the pile U's from said second opening when said one or more paddle wheels are driven to rotate;

a weight pan configured to receive the pile U's that egress from said second opening of said hopper, said weight pan comprising a load cell configured to stop rotation of said one or more paddle wheels when a preset weight of the pile U's with residual backing fibers is received therein;

a shaker pen comprising: one or more mesh walls configured to form an upper opening and a lower opening; a cover pivotally secured thereto and configured to pivot to enclose said top opening; and a mesh cover pivotally secured thereto and configured to pivot to enclose said lower opening to form an enclosed volume; said upper opening configured to receive said preset weight of the pile U's with residual backing fibers from said weight pan; said mesh comprising openings sized to inhibit egress therefrom of the longer backing fibers but to permit egress of the pile U's; and means for shaking said shaker pen for a set period of time to separate a substantial percentage of the residual backing fibers from the pile U's of the second separated portion.

2. The carpet recycling apparatus according to claim 1 wherein said enclosed volume, said preset weight of the pile U's with residual backing fibers, and said set period of time for shaking of said shaker pen are coordinated for optimal separation of a substantial amount of the backing fibers from the pile U's of said second separated portion.

3. The carpet recycling apparatus according to claim 2 further comprising a fibermill configured to receive the substantially backing-fiber-free pile U's from said shaker pen, said fibermill comprising one or more hammers configured to rotate therein to crush and remove the remnant adhesive attached to the pile U's.

4. The carpet recycling apparatus according to claim 3 further comprising a willow cleaner machine configured to receive the pile U's, said willow cleaner machine comprising a cylindrical chamber and a shaft, said shaft comprising a series of spokes spirally positioned thereon, said shaft configured to rotate to cause said spokes to agitate the pile U's within said chamber, said willow cleaning machine comprising a plurality of perforations in a bottom of said chamber sized to remove particulates separated from the pile U's agitated in said chamber.

5. The carpet recycling apparatus according to claim 3 further comprising a rotating squirrel cage with perforations thereon, and means for creating vacuum pressure between an outer surface and an inner surface of said perforated squirrel cage; said outer surface of said rotating squirrel cage configured to receive the pile U's thereon of a portion of said rotation to remove dust and adhesive therefrom.

* * * * *